United States Patent [19]
Sugiyama et al.

[11] Patent Number: 5,737,471
[45] Date of Patent: Apr. 7, 1998

[54] OPTICAL WAVEGUIDE TUBE

[75] Inventors: Hideo Sugiyama, Higashimurayama; Masato Sugimachi, Kodaira; Atsushi Hotta, Higashikurume; Minoru Ishiharada, Urawa; Itsuo Tanuma, Sayama; Torao Hashimoto, Yokohama, all of Japan

[73] Assignee: Bridgestone Corporation, Tokyo, Japan

[21] Appl. No.: 649,107

[22] Filed: May 17, 1996

[30] Foreign Application Priority Data

| May 19, 1995 | [JP] | Japan | 7-145359 |
| May 19, 1995 | [JP] | Japan | 7-145360 |
| May 19, 1995 | [JP] | Japan | 7-145361 |
| May 19, 1995 | [JP] | Japan | 7-145362 |

[51] Int. Cl.⁶ .................................. G02B 6/02
[52] U.S. Cl. .............. 385/123; 385/76; 385/77; 385/78; 385/84; 385/80
[58] Field of Search ................ 385/70, 72, 73, 385/76, 77, 78, 80, 38, 84, 123, 134, 139, 147

[56] References Cited

U.S. PATENT DOCUMENTS

| 3,858,577 | 1/1975 | Bass et al. | 128/8 |
| 4,261,640 | 4/1981 | Stankos et al. | 385/140 X |
| 4,383,732 | 5/1983 | Dalgoutte et al. | 385/78 X |
| 4,398,796 | 8/1983 | Dalgoutte et al. | 385/78 X |
| 4,639,078 | 1/1987 | Sheem | 385/140 X |
| 4,768,849 | 9/1988 | Hicks, Jr. | 385/48 X |
| 5,113,476 | 5/1992 | Okada et al. | 385/140 |

FOREIGN PATENT DOCUMENTS

| 0 274 771 A2 | 7/1988 | European Pat. Off. | 385/12 X |
| 60-39607 | 3/1985 | Japan | 385/123 X |
| WO 92/02604 | 8/1982 | WIPO | 385/123 X |

OTHER PUBLICATIONS

Patent Abstracts of Japan, vol. 9, No. 263 (P-371) Jul. 9, 1985 (JP-60-39607).

*Primary Examiner*—Brian Healy
*Attorney, Agent, or Firm*—Sughrue, Mion, Zinn, Macpeak & Seas, PLLC

[57] ABSTRACT

In an optical waveguide tube comprising a tubular cladding filled with a solid core having a higher refractive index than the cladding, a light transmissive window member is disposed in close contact with at least the end face of the core on a light incident side for protecting the core end face from thermal influence and contamination. Means disposed around the cladding and the window member for securing the window member to the cladding may be a tape wrapped around them or a heat shrinkable sleeve or a ferrule. Alternatively, a ferrule surrounding the outer periphery of the cladding at each end is fastened for securing the cladding to the core at each end for preventing the core from projecting out of the cladding. The ferrule may have a collar disposed in abutment with the core end face.

28 Claims, 6 Drawing Sheets

OPTICAL WAVEGUIDE TUBE

BACKGROUND OF THE INVENTION

1. Field of the Invention

This invention relates to an optical waveguide tube comprising a tubular cladding filled with a solid core having a higher refractive index than the cladding.

2. Prior Art

Optical waveguide tubes comprising a transparent core and a tubular cladding around the core having a lower refractive index than the core have been used in a variety of optical transmission applications. It is a routine to increase the diameter of the core to 3 mm or greater in order to effectively transmit a larger amount of light. Both solid and liquid cores are known in the art. The solid cores, especially plastic single cores are advantageous because of ease of handling, for example, ease of cutting to a desired length.

Optical waveguide tubes of this type receive light from a light source at one end face of the solid core, transmit light therethrough, and emit light from an opposite end face of the core. Since the one end face of the core is given by cutting, it contains minute irregularities so that entrance efficiency is low. Even if the one end face is worked to a smooth surface by polishing, dust and debris are deposited thereon from the outside. When light from a light source directly reaches the one end face, a portion of light is absorbed by such contaminants and converted into heat. This means that all the light incident on the one end face of the core is not transmitted by the core so that the efficiency of light transmission may be reduced. Additionally, since the incident light has relatively high energy, the one end face is heated to a relatively high temperature so that the core may be thermally expanded or deteriorated and even burnt at the one end face, leading to a risk of fire. The core end face can be clouded white in the presence of moisture, also leading to a loss of transmittance. There is a demand for overcoming these problems.

When the core undergoes thermal expansion due to direct exposure to light and changes in the ambient atmosphere, the core can project out of the cladding because of the difference in coefficient of thermal expansion between the core and the cladding, especially when the cladding is made of a fluoro resin. The position of light incidence then changes to alter the quantity of incident light. Also the end face of the core and the outer periphery of its projecting portion can be deformed to alter transmission capability. These undesirably change the efficiency of light incidence.

Particularly when the core is formed of flexible plastic materials such as acrylic resins, the core is more likely to project out of the cladding. Such core projection leads to losses of light incidence efficiency and light quantity transmitted. Once the core projects out of the cladding, the tube does not always resume the original state when the temperature is restored. The tube can be fixed with the core projected. This is undesirable especially at the incident side.

SUMMARY OF THE INVENTION

A first object of the present invention is to provide an optical waveguide tube of the solid single core type which prevents the core end face from being directly heated upon exposure to light.

A second object of the present invention is to provide an optical waveguide tube of the solid single core type which prevents the core from projecting out of the cladding.

Broadly stated, the present invention is directed to an optical waveguide tube comprising a tubular cladding filled with a solid core having a higher refractive index than the cladding. The tube and hence, the core has axially opposed end faces on light incident and emergent sides.

The first object of the invention is achieved in a first embodiment by disposing a light transmissive window member in close contact with at least the end face of the core on the light incident side over its entire surface, preferably with each of the end faces of the core over its entire surface. The close contact is preferably attained by bonding the window member to the core end face with an adhesive. The optical waveguide tube of the invention becomes more advantageous when the core is formed of a flexible plastic material and the window member is formed of an inorganic glass material.

The optical waveguide tube of the first embodiment is of the solid single core type wherein light from a light source directly reaches the core for light entry. In such application, various inconvenient problems arose with conventional waveguide tubes. In the optical waveguide tube of the invention wherein a light transmissive window member is disposed in close contact with at least the incident end face of the core, light from a light source reaches the window member and enters the core through the window member. This prevents heat generation by direct entry of incident light to the core end face due to light absorption by fine irregularities and deposits on the core end face, and thus prevents the core from being directly heated by light irradiation. This, in turn, prevents the core from thermal expansion and deterioration and eliminates the risk that the core end face is heated by high energy light to a temperature high enough and burn to cause a fire. Also the window member prevents dust and contaminants from depositing on the core end face and shuts off moisture from the ambient atmosphere so that the core may experience a minimal loss of transmittance. Ultraviolet radiation which otherwise enters the core is absorbed by the window member so that only a reduced quantity of ultraviolet radiation enters the core, minimizing deterioration of the core by direct incidence of ultraviolet radiation on the core end face. These advantages become more prominent when the window member is made of inorganic glass. The present invention is very effective to optical waveguide tubes wherein the core is made of a flexible plastic material which is relatively less resistant to heat, has a high efficient of thermal expansion, and is likely to undergo thermal deterioration.

In an optical waveguide tube according to a second embodiment of the invention, a light transmissive window member is disposed in close contact with at least the end face of the core on a light incident side over its entire surface, and securing means is disposed around the cladding and the window member for securing the window member to the cladding. The securing means may be a tape wrapped around the cladding and the window member or a sleeve and/or a ferrule surrounding the cladding and the window member. The tape may be wrapped on the outer periphery of the cladding and the window member with an adhesive, typically pressure-sensitive adhesive intervening therebetween. This is simply accomplished by using a pressure-sensitive adhesive tape. The sleeve may be a heat shrinkable sleeve which is heat shrunk to cover the outer periphery of the cladding and the window member. It is also possible that the heat shrunk sleeve surrounds the cladding via the tape wrapping. It is also effective to adhesively bond the ferrule to the cladding. The tape, sleeve and ferrule may be used in any combination.

In addition to the advantages described for the first embodiment, the optical waveguide tube of the second embodiment has the advantage that since the window member is secured to the cladding by wrapping a pressure-sensitive adhesive tape or fitting a heat shrinkable sleeve or ferrule, the window member restricts axial motion of the core within the cladding, eliminating the inconvenience that the core might project out of the cladding due to thermal expansion when the ambient atmosphere is hot.

Even in the embodiment of the optical waveguide tube wherein the window member is in close contact with the core end face for protection, if the core can project out of the cladding, then dust and contaminants will deposit on the outer periphery of the projecting core portion, the core will absorb moisture through the projecting portion, and light and heat will directly act on the projecting core portion. The second embodiment wherein the core is firmly secured to the cladding is effective for preventing the core from projecting out of the cladding, eliminating the inconvenient problems described just above. This ensures that the core is protected by the window member.

The second object of the invention is achieved in a third embodiment by fitting a ferrule to surround the outer periphery of the cladding at each end. The ferrule is fastened or crimped for securing the cladding to the core at each end.

Preferably, a light transmissive window member of inorganic glass is disposed in close contact with at least the end face on a light incident side by adhesive or other bonding means. When the ferrule is fastened to the cladding, a tape or sleeve of flexible plastic material may be interposed between the ferrule and the cladding. Particularly when the window member is in close fit with the core end face, a tape may be continuously wrapped on the cladding and the window member with an adhesive, typically pressure-sensitive adhesive intervening therebetween, or a heat shrinkable sleeve is fitted over the cladding and the window member and heat shrunk thereto, or a heat shrinkable sleeve is fitted over the tape wrapping and heat shrunk thereto, for the purpose of securing the window member to the cladding. In these cases, the ferrule may be fitted over the tape wrapping or the sleeve and fastened to the cladding.

The optical waveguide tube of the third embodiment is of the solid single core type. Since the solid core is firmly secured to the cladding by fastening the ferrule thereover, this embodiment prevents the core from projecting out of the cladding due to thermal expansion, eliminating the above-mentioned problems including reduced efficiency of light incidence and deformation of the projecting core end. Even when the core end is heated, the metallic ferrule characterized by effective heat transfer and heat dissipation is effective for quickly dissipating the heat to the outside. In this regard, the ferrule minimizes thermal influence on the core end. Where a light transmissive window member is disposed in close contact with at least the incident end face of the core, it prevents heat generation by direct entry of incident light to the core end face and thus prevents the core from thermal expansion.

In an optical waveguide tube according to a fourth embodiment of the invention, a tubular member is secured to the cladding at each end for surrounding the outer periphery thereof. The member has at one end a radially inwardly extending collar which is abutted against the core end face.

The tubular member may be a metallic ferrule having a radially inwardly extending collar at one end. In this case, by fastening or crimping the ferrule, the ferrule may be secured to the cladding for securing the core to the cladding. A tape or sleeve of plastic material may be interposed between the ferrule and the cladding. Also preferably, a light transmissive window member of inorganic glass is disposed in close contact with at least the end face on a light incident side by adhesive or other bonding means. In this preferred embodiment, the collar of the tubular member is abutted against the outer surface of the window member. Where the tubular member is a ferrule which is fastened to the cladding, a tape or sleeve of flexible plastic material may be interposed between the ferrule and the cladding. Particularly when the window member is in close fit with the core end face, a tape may be continuously wrapped on the cladding and the window member with an adhesive, typically pressure-sensitive adhesive intervening therebetween, or a heat shrinkable sleeve is fitted over the cladding and the window member and heat shrunk thereto, or a heat shrinkable sleeve is fitted over the tape wrapping and heat shrunk thereto, for the purpose of securing the window member to the cladding. In these cases, the ferrule may be fitted over the tape wrapping or the sleeve and fastened to the cladding.

The optical waveguide tube of the fourth embodiment is also of the solid single core type. Since the annular collar of the tubular member at the inner surface abuts the end face of the core or the outer surface of the window member where the window member is in close fit with the core end face, this embodiment prevents the core from projecting out of the cladding due to thermal expansion, eliminating the above-mentioned problems including reduced efficiency of light incidence and deformation of the projecting core end. Where the tubular member is a metallic ferrule which is fastened to the cladding, the core is firmly secured to the cladding so that projection of the core from the cladding is more effectively prevented. Even when the core end is heated, the metallic ferrule characterized by effective heat transfer and heat dissipation is effective for quickly dissipating the heat to the outside and hence, minimizing thermal influence on the core end. Where the light transmissive window member is disposed in close contact with at least the incident end face of the core, it prevents heat generation by direct entry of incident light to the core end face and thus prevents the core from thermal expansion.

BEST MODE FOR CARRYING OUT THE INVENTION

Various embodiments of the present invention are described below in conjunction with the figures. Optical waveguide tubes have the same basic structure throughout the figures. That is, an optical waveguide tube generally designated at 1 is illustrated as comprising a tubular transparent cladding 2 which is filled with a solid core 3 having a higher refractive index than the cladding 2. The tube 1 and hence, the core 3 has axially opposed end faces on light incident and emergent sides although only the light incident side is shown in the figures.

Figure 1:
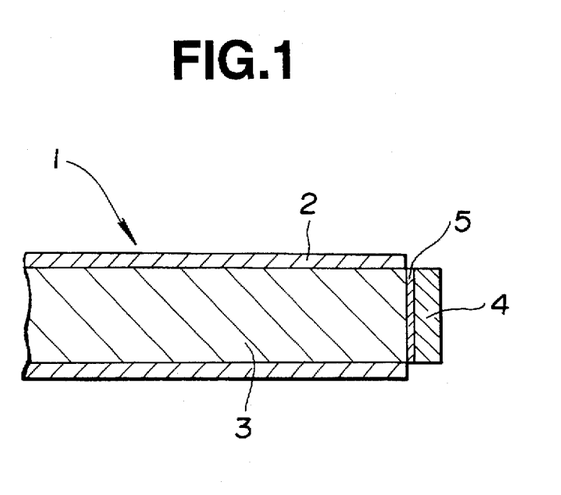
FIG. 1 is a fragmental cross-sectional view of one exemplary optical waveguide tube according to a first embodiment of the invention.
Figure 2:
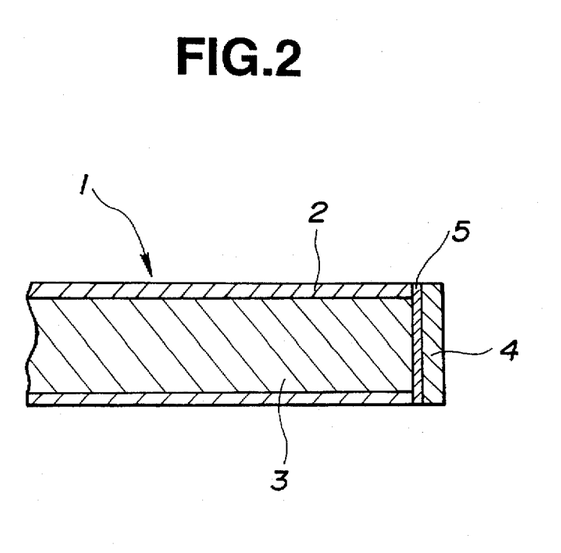
FIG. 2 is a fragmental cross-sectional view of another exemplary optical waveguide tube according to the first embodiment of the invention.

In the first embodiment of the invention, as shown in FIG. 1, the optical waveguide tube 1 further includes a light transmissive window member 4 disposed in close contact with at least the end face of the core on the light incident side, preferably with each of the end faces of the core. The window member 4 is in close fit with the core end face over its entire surface. In the illustrated embodiment, the close contact is attained by bonding the window member 4 to the core 3 end face with an adhesive 5. The window member 4 may be closely contacted or bonded to either only the end face of the core 3 as shown in FIG. 1 or both the end faces of the core 3 and the cladding 2 as shown in FIG. 2 although the latter is preferred.

The window member and the core are in close contact so that no air layer intervenes therebetween, thereby increasing the efficiency of light incidence from the window member to the core. The adhesive bonding of the window member to the core, preferably to both the core and the cladding at the end face thereof minimizes projection or retraction of the core relative to the cladding even when the core is thermally expanded or contracted as a result of a temperature variation of the service atmosphere and the presence or absence of light irradiation.

The hollow tubular cladding is preferably made of plastic and elastomeric materials which are flexible, moldable into tubing, and have a relatively low refractive index. Exemplary cladding materials include polyethylene, polypropylene, polyamide, polystyrene, ABS resins, polymethyl methacrylate, polycarbonate, polyvinyl chloride, polyvinylidene chloride, polyvinyl acetate, ethylene-vinyl acetate copolymers, polyvinyl alcohol, ethylene-vinyl alcohol copolymers, fluoro-resins, silicone resins, natural rubber, polyisoprene rubber, polybutadiene rubber, styrene-butadiene copolymers, butyl rubber, halogenated butyl rubber, chloroprene rubber, acryl rubber, EPDM, acrylonitrile-butadiene copolymers, fluoro-rubber, and silicone rubber.

Preferred among others are silicone polymers and fluorinated polymers having a low refractive index. Examples include silicone polymers such as polydimethyl-siloxane polymers, polymethylphenylsiloxane polymers, and fluorosilicone polymers; polytetrafluoroethylene (PTFE), tetrafluoroethylene-hexafluoropropylene copolymers (FEP), tetrafluoroethylene-perfluoroalkoxyethylene copolymers (PFE), polychlorotrifluoroethylene (PCTFE), ethylene tetrafluoride-ethylene copolymer (ETFE), polyvinylidene fluoride, polyvinyl fluoride, vinylidene fluoride-trifluorochloroethylene copolymers, vinylidene fluoride-hexafluoropropylene copolymers, vinylidene fluoride-hexafluoropropylene-tetrafluoroethylene terpolymers, tetrafluoroethylene-propylene rubber, and fluorinated thermoplastic elastomers. These materials may be used alone or in admixture of two or more.

The solid material of which the core is formed may be selected from various materials which have a higher refractive index than the cladding. Flexible plastic materials are preferred in the practice of the invention.

More particularly, homopolymer and copolymer resins of (meth)acrylic monomers are preferably used. More preferred are copolymers of at least one monomer selected from Groups A and B shown below and homopolymers and copolymers of a monomer selected from Group B.

Group A: Esters of (meth)acrylic acid with lower alcohols having 1 to 5 carbon atoms.

Group B: Monomers of general formulae (1) and (2) shown below.

(1)

In formula (1), $R^1$ is a hydrogen atom or methyl group, $R^2$ is an alkyl group having 8 to 20 carbon atoms.

(2)

In formula (2), $R^3$ is a hydrogen atom or methyl group, $R^4$ is an alkyl or aryl group, letter n is an integer of 1 to 10, and m is an integer of 1 to 10.

The light transmissive material of which the window member is formed includes inorganic glass materials such as quartz glass, Pyrex® glass, multicomponent glass, sapphire, and rock crystal, and organic glass and plastic transparent materials such as polyethylene, polypropylene, ABS resins, acrylonitrile-styrene copolymers, styrene-butadiene copolymers, acrylonitrile-EPDM-styrene terpolymers, styrene-methyl methacrylate copolymers, (meth)acrylic resins, epoxy resins, polymethylpentene, allyl diglycol carbonate resins, spiran resins, amorphous polyolefins, polycarbonates, polyamides, polyarylates, polysulfones, polyallylsulfones, polyether sulfones, polyether imides, polyimides, polyethylene terephthalate, diallyl phthalate, fluoro-resins, polyester carbonates, and silicone resins. Among these, inorganic glass materials such as quartz glass, Pyrex® glass, and multicomponent glass offer superior performance since they are not only highly transparent, but also heat resistant and chemically stable.

Where the window member is adhesively bonded to the core, the adhesive may be selected from transparent adhesives, for example, adhesives based on acrylic resins, epoxy resins, phenolic resins, cyanoacrylate resins, silicone resins, and chloroprene rubber.

In the practice of the invention, the window member is preferably formed as a disc having an axial thickness of 0.1 to 5 cm, especially 0.3 to 2 cm. The incident end face of the window member is preferably finished to a smooth surface for increasing the efficiency of light incidence on that end face.

Although the optical waveguide tube of the invention favors to use an adhesive as means for providing close contact between the window member and the core, it is acceptable, for example, to interpose grease between the core and the window member and securing the window member to the cladding by suitable coupling means. In either case, it is preferred that the window member and the core are in close contact so that no air layer intervenes therebetween. Heat fusing is also acceptable.

Owing to the window member attached to the end face of the core, the optical waveguide tube of the first embodiment prevents heat generation by direct entry of incident light to the core end face, thereby minimizing thermal expansion and deterioration by such heat generation and eliminating the risk of the core burning and catching fire. The invention also prevents deterioration of the core end face by deposition of contaminants from the ambient atmosphere and penetration of moisture. The tube thus maintains a superior light transmitting function.

In the second embodiment of the invention, the optical waveguide tube having a light transmissive window member disposed in close contact with at least the end face of the core on the light incident side over its entire surface further includes securing means disposed around the cladding and the window member for securing the window member to the cladding. The securing means may be a tape continuously wrapped around the cladding and the window member. Alternatively, the securing means is a sleeve and/or a ferrule surrounding the cladding and the window member.

Figure 3:
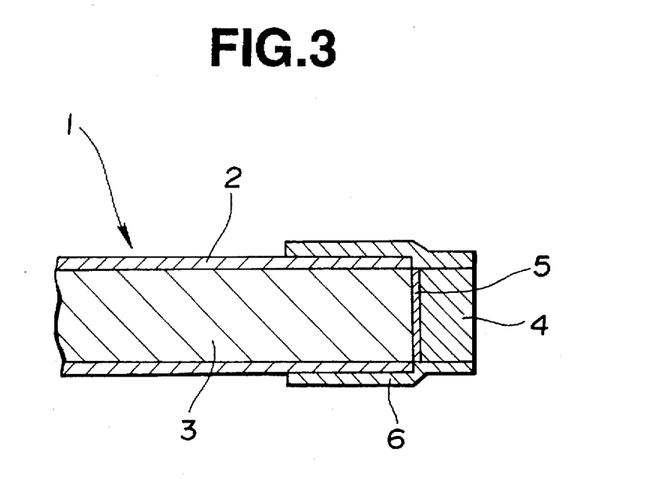
FIG. 3 is a fragmental cross-sectional view of one exemplary optical waveguide tube according to a second embodiment of the invention.
Figure 4:
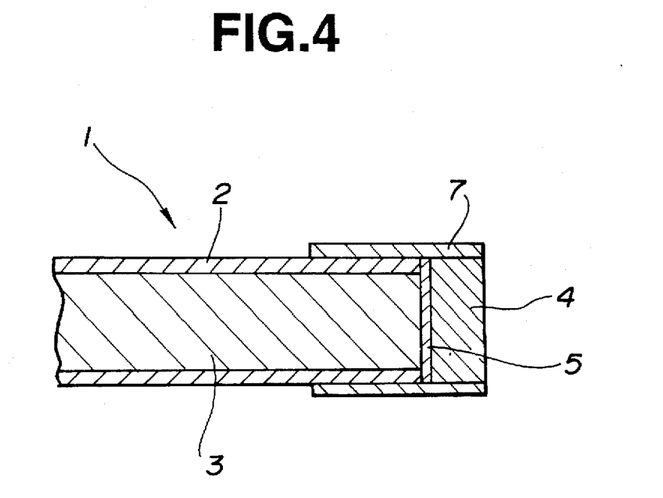
FIG. 4 is a fragmental cross-sectional view of another exemplary optical waveguide tube according to the second embodiment of the invention.

In one example, as illustrated in FIG. 3, a heat shrinkable sleeve or tubing 6 is fitted so that it may cover the outer periphery of an end portion of the cladding 2 and the entire outer periphery of the window member 4 whereupon the sleeve 6 is heat shrunk to tightly fit on the cladding 2 and the window member 4 for firmly securing the window member 4 to the cladding 2. In another example, as illustrated in FIG. 4, a pressure-sensitive adhesive tape 7 is tightly wound on the outer periphery of an end portion of the cladding 2 and the entire outer periphery of the window member 4 for firmly securing the window member 4 to the cladding 2. In a further example, as illustrated in FIG. 5, a pressure-sensitive adhesive tape 7 is wound on the cladding 2 and the window member 4 as in the embodiment of FIG. 4 and a heat shrinkable sleeve 6 is fitted over the tape wrapping 7 and heat shrunk for tight fit.

The pressure-sensitive adhesive tape used herein may be selected from those adhesive tapes prepared by coating substrates such as fabric, nonwoven fabric, plastic films and metal films with pressure-sensitive adhesives of acrylic, butyl rubber, natural rubber, hot melt, and silicone systems, for example. The substrates include films of polyamide resins, polyethylene terephthalate resins, fluoro-resins, polypropylene resins, polyethylene resins, polyimide resins (e.g., Kapton®), glass fibers, brass, aluminum, copper, and stainless steel as well as metallized plastic films. The heat shrinkable sleeve used herein may be selected from tubes of Teflon®, PFA, FEP, dual TFE/FEP, synthetic rubber, polyethylene, silicone rubber, and polyvinyl chloride systems.

In the second embodiment, the manner of wrapping a tape or fitting a sleeve is not limited to the illustrated examples. For example, a plastic tape or sleeve may be bonded to the outer periphery of the cladding and the window member while separately applying an adhesive. An adhesive may be coated to the outer periphery of the cladding and the window member before a heat shrinkable sleeve is heat shrunk thereto.

Figure 5:
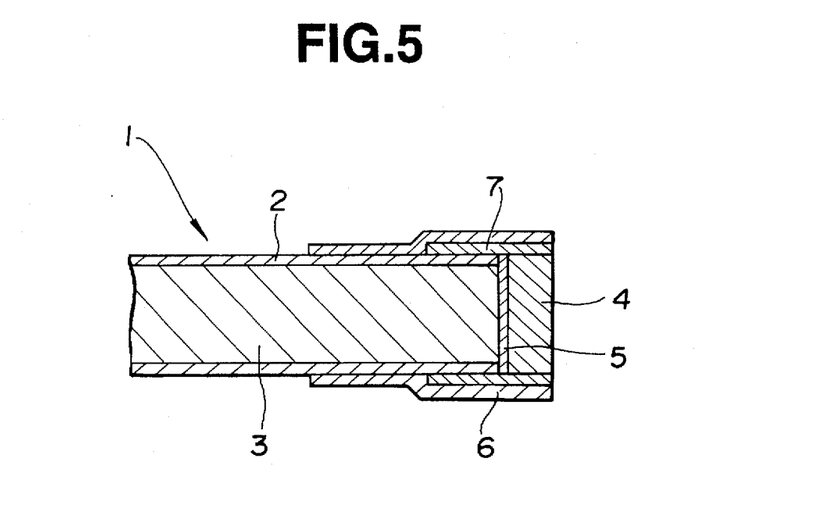
FIG. 5 is a fragmental cross-sectional view of a further exemplary optical waveguide tube according to the second embodiment of the invention.

Since the window member closely abuts the core end face with the window member coupled to the cladding, the optical waveguide tubes illustrated in FIGS. 3 to 5 are effective for restricting axial motion of the core, thereby preventing the core from projecting out of the cladding due to thermal expansion. The example of FIG. 5 is especially advantageous since the window member is more firmly and integrally coupled to the cladding.

Figure 6:
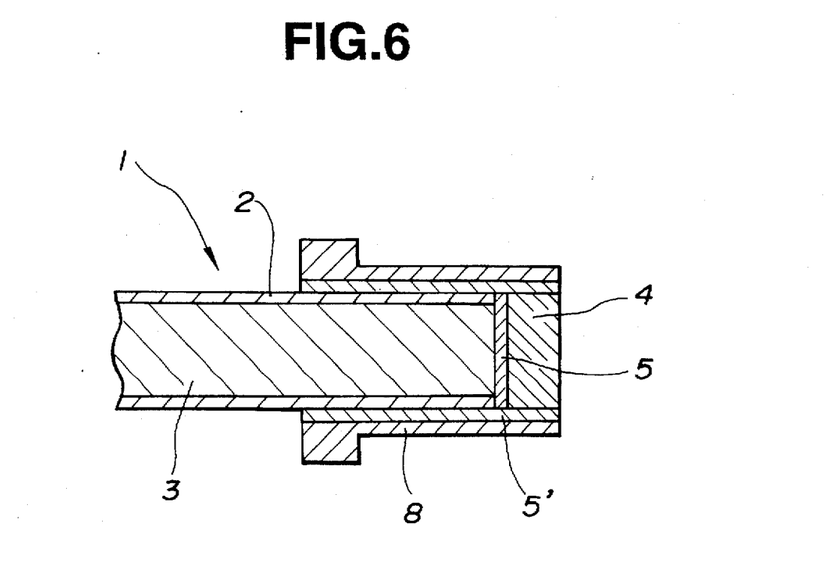
FIG. 6 is a fragmental cross-sectional view of a still further exemplary optical waveguide tube according to the second embodiment of the invention.

FIG. 6 shows a still further example of the optical waveguide tube according to the second embodiment. A ferrule 8 is bonded to an end portion of the cladding 2 and the window member 4 with an adhesive 5' so as to surround the outer periphery of the cladding end portion and the entire outer periphery of the window member 4. This example has the same function and results as the above-mentioned examples. Upon adhesive bonding of the ferrule 8 to the cladding 2, preferably the cladding at its outer periphery is previously subject to surface treatment for improving adhesion, for example, surface treatment with sodium-based agents and plasma treatment. The adhesive 5' used herein may be the same as that used in bonding the window member to the core end face. The ferrule 8 may be either metallic or plastic. The metallic ferrule which is improved in heat transfer has the function of quickly dissipating heat even when the core end is heated. The metallic ferrule may be made of stainless steel, aluminum, copper, brass, iron and plated such metals.

In addition to the advantages mentioned in conjunction with the first embodiment, the optical waveguide tube according to the second embodiment of the invention has the advantage of eliminating the inconvenience that the core projects out of the cladding when the core undergoes thermal expansion.

Figure 7:
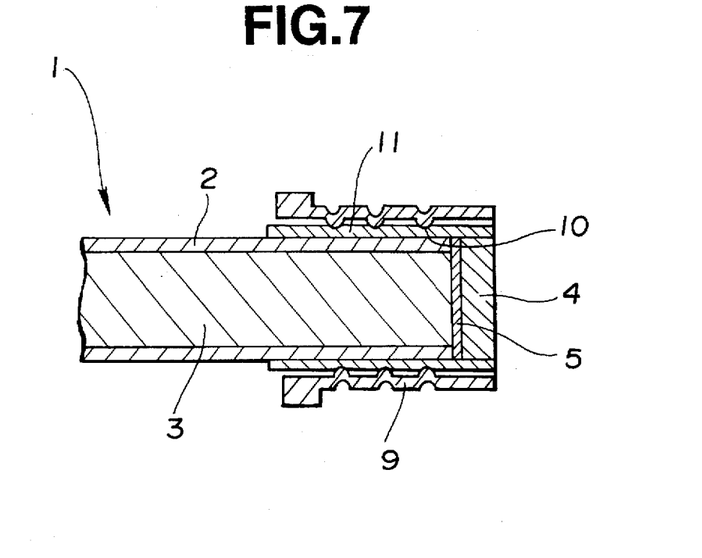
FIG. 7 is a fragmental cross-sectional view of one exemplary optical waveguide tube according to a third embodiment of the invention.
Figure 8:
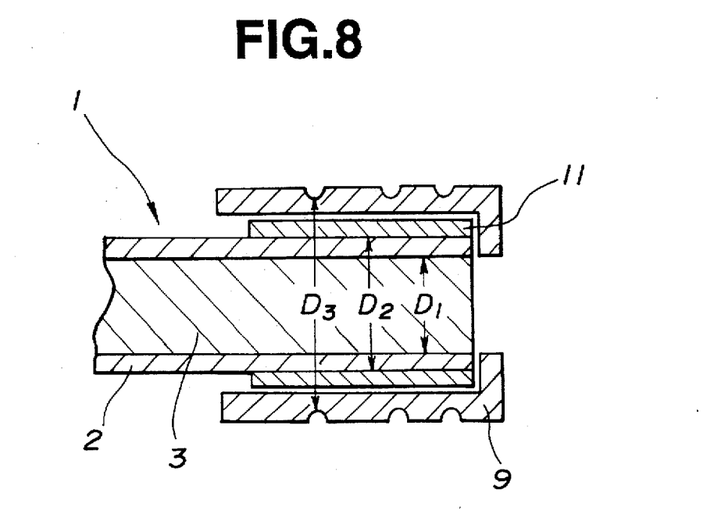
FIG. 8 is a fragmental cross-sectional view of another exemplary optical waveguide tube according to the third embodiment of the invention.

Referring to FIGS. 7 and 8, the third embodiment of the invention is described. In one example as shown in FIG. 7, the optical waveguide tube comprising a tubular transparent cladding 2 and a solid core 3 encased therein having a higher refractive index than the cladding further includes a ferrule 9 surrounding the outer periphery of the cladding at each end. The ferrule 9 is fastened at 10 for securing the cladding 2 to the core 3 at each end. Preferably a light transmissive window member 4 as previously described in conjunction with the first embodiment is disposed in close contact with at least the end face of the core 3 on the light incident side, preferably with each of the end faces of the core 3. In the illustrated embodiment, the close contact is attained by bonding the window member 4 to the core 3 end face with an adhesive 5. The window member 4 may be closely contacted or bonded to either only the end face of the core 3 or both the end faces of the core 3 and the cladding 2, although the latter is preferred. Further preferably, an intermediate layer 11 in the form of a sleeve or tape is interposed between the cladding 2 and the ferrule 9. As shown in FIG. 8, the ferrule 9 may be provided at its rear end with an annular collar extending radially inwardly therefrom for tip protection.

The ferrule 9 may be made of stainless steel, aluminum, copper, brass, iron and plated such metals. The ferrule 9 is preferably fastened with a crimping rate of 10 to 90%, especially 20 to 60%. With a too low crimping rate, the ferrule would be less effective for preventing the core from projecting out of the cladding. Fastening the ferrule with too high a crimping rate would cause an increased optical loss of the core. The fastening method is not critical. The ferrule may be fastened in a three ring pattern as shown in FIGS. 7 and 8 or a four ring pattern by any desired caulking means.

Zone fastening is also acceptable.

The crimping rate used herein is a percent deformation of the entire optical waveguide tube including the intermediate layer (tape or sleeve) if any. It is empirically determined according to the following equation (see FIG. 8).

$$\text{Crimping rate (\%)} = \frac{D3 - tf}{D1 + tc + ti} \times 100$$

tc: a gage of the cladding
ti: a gage of the intermediate layer
tf: a gage of the ferrule
D1: an outer diameter of the core
D2: an outer diameter of the cladding
D3: a diameter of a crimped groove Before the ferrule 9 is fastened to firmly secure the core 3 to the cladding 2, a plastic tape or sleeve 11 may be interposed between the ferrule 9 and the cladding 2 as shown in FIG. 7. Particularly when the window member 4 is disposed in close contact with the core end face, better results are obtained by using a pressure-sensitive adhesive tape as the intermediate layer 11 and wrapping the tape around the cladding 2 and the window member 4 so as to cover the outer periphery of an end portion of the cladding 2 and the entire outer periphery of the window member 4 for coupling the window member 4 to the cladding 2. By coupling the window member 4 to the cladding 2, the core 3 is also restricted by the window member 4 so that projection of the core 3 from the cladding 2 is more positively prevented. A heat shrinkable sleeve may be used as the intermediate layer 11 instead of the adhesive tape. The heat shrinkable sleeve 11 is fitted around the cladding 2 and the window member 4 to cover the outer periphery of an end portion of the cladding 2 and the entire outer periphery of the window member 4. The heat shrinkable sleeve 11 is heat shrunk for coupling the window member 4 to the cladding 2. The ferrule 9 is fastened over the tape or sleeve 11 to provide tighter anchoring effect. It is also possible to wrap a tape on the cladding and the window member, fit a heat shrinkable sleeve on the tape wrapping, and heat shrink the sleeve before a ferrule is fitted and fastened in place.

The type and wrapping of a pressure-sensitive adhesive tape, the type of a heat shrinkable sleeve and the like are the same as previously described in conjunction with the second embodiment. Preferably the intermediate layer 11 is made of a material having a lower modulus than the core and the cladding, low creep, and high frictional resistance with respect to the cladding and the ferrule for the purposes of minimizing deformation of the core to reduce optical losses and preventing removal of the sleeve.

Figure 9:
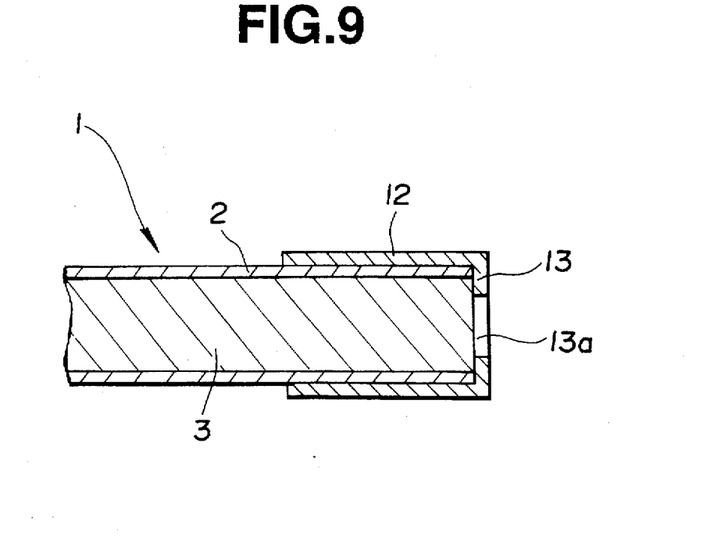
FIG. 9 is a fragmental cross-sectional view of one exemplary optical waveguide tube according to a fourth embodiment of the invention.
Figure 10:
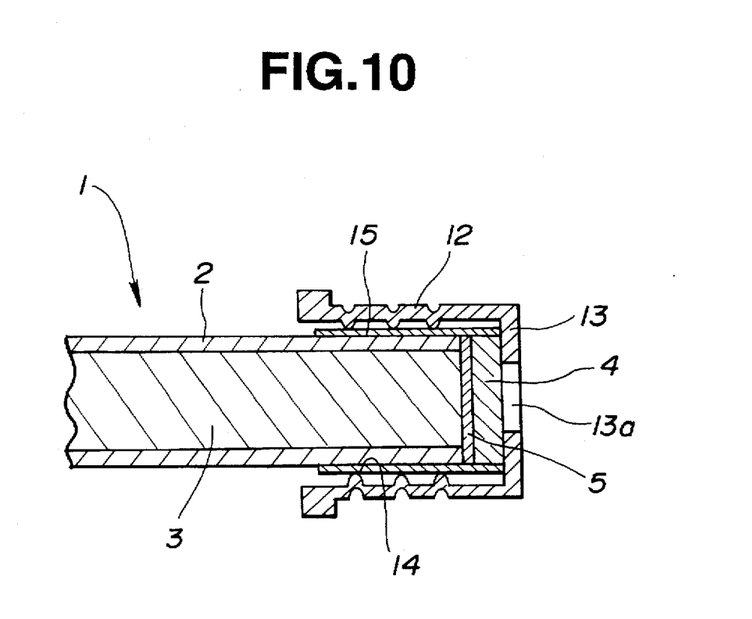
FIG. 10 is a fragmental cross-sectional view of another exemplary optical waveguide tube according to the fourth embodiment of the invention.

Referring to FIGS. 9 to 12, the fourth embodiment of the invention is described. In an optical waveguide tube according to this embodiment, as shown in FIG. 9, a tubular member 12 is secured to the cladding 2 at each end to cover the outer periphery thereof. The tubular member 12 has at one end a collar 13 which extends radially inwardly from the inner surface past the cladding 2 to the core 3 and which defines an opening 13a. The axially inside surface of the collar 13 is abutted against the end face of the core 3. In another example as shown in FIG. 10, a light transmissive window member 4 is disposed in close contact with at least the end face on the light incident side, preferably with each of the end faces on the light incident and emergent sides. In this case, the collar 13 of the tubular member 12 is abutted against the outer surface of the window member 4. The close contact of the window member 4 is typically achieved by bonding the window member 4 to the end face of the core 3 with an adhesive 5.

The tubular member 12 may be either metallic or plastic. The tubular member 12 is secured to the cladding 2 by any desired means, for example, adhesive bonding and mechanical fastening. Preferably the tubular member 12 is a metallic ferrule having a radially inwardly extending collar at one end. In this case, the ferrule may be secured to the cladding with the aid of an adhesive as mentioned above, but preferably by mechanically fastening the ferrule. At the same time as the ferrule is secured to the cladding, the core is secured to the cladding. The ferrule may be made of stainless steel, aluminum, copper, brass, iron and plated such metals. The ferrule is preferably fastened to a crimping rate of 10 to 90%, especially 20 to 60%. The crimping rate used herein is as defined above. With a too low crimping rate, the ferrule would be less effective for securing the core to the cladding. Fastening the ferrule to a too high crimping rate would cause an increased optical loss of the core. The fastening method is not critical. The ferrule may be fastened in a three ring pattern as shown in FIG. 10 or a four ring pattern by any desired caulking means. In the example shown in FIG. 10, the ferrule 12 is fastened at 14 to the cladding 2 through an intermediate layer 15 in the form of a tape or sleeve. The intermediate layer 15 is the same as the intermediate layer 11 previously described for the third embodiment in conjunction with FIGS. 7 and 8.

Figure 11:
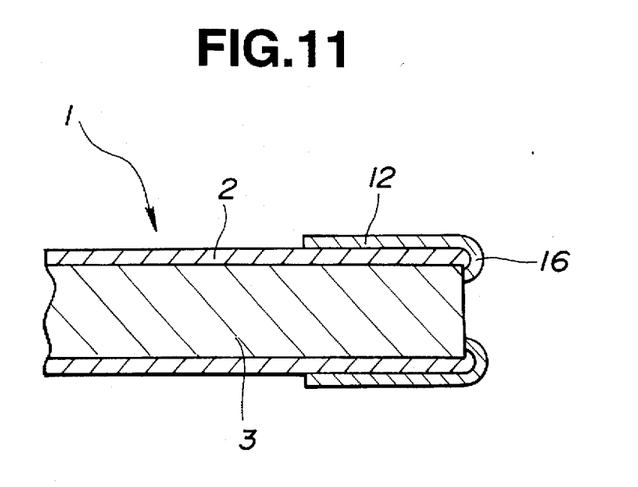
FIG. 11 is a fragmental cross-sectional view of a further exemplary optical waveguide tube according to the fourth embodiment of the invention.
Figure 12:
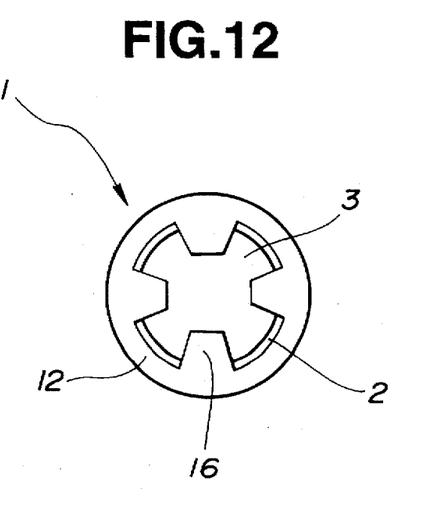
FIG. 12 is an enlarged front view of the tube of FIG. 11.

The shape of the collar of the tubular member 12 is not limited to the annular one 13 shown in FIGS. 9 and 10. The collar may be discontinuous, that is, consist of a plurality of spaced-apart tabs 16 extending from the inner surface of the tubular member 12 as shown in FIGS. 11 and 12. The collar is only required to engage the core 3 or window member 4 for retaining it.

The collar 13 of the tubular member 12 defines the opening 13a which may have a diameter as small as about 1 mm if the light source is a beam light source such as a laser. However, the opening 13 preferably has a larger diameter so that light may enter the core without obstruction.

The optical waveguide tubes of the third and fourth embodiments prevent projection of the core from the cladding due to thermal expansion of the core, thereby eliminating inconvenient problems such as a reduced efficiency of light incidence and deformation of a projecting end portion of the core.

The provision of the metallic ferrule improves heat dissipation at the core end, suppressing thermal expansion and deterioration of the core. Where the light transmissive window member is in close contact with the end face of the core on the light incident side, the window member prevents heat generation at the core end face by direct irradiation of light from a light source to the core end face, thereby minimizing thermal expansion and deterioration and eliminating the risk of the core giving rise to combustion and fire. The window member also prevents deterioration of the core by deposition of contaminants on the core end face from the surrounding atmosphere and penetration of moisture, helping the core maintain a stable light transmitting function. Where the window member is secured to the cladding, the above-mentioned projection of the core from the cladding is more effectively prevented. The securing ensures that the core is protected by the window member.

EXAMPLE

Examples of the present invention are given below by way of illustration and not by way of limitation.

Example 1

An optical waveguide tube having a diameter of 10 mm was prepared using a PEP tube with a gage of 0.6 mm as the cladding and a 4/6 copolymer of Acrylate M and Acrylate SL (manufactured by Mitsubishi Rayon K.K.) as the core. As shown in FIG. 2, a window disc of quartz having a thickness of 1 cm was bonded to one end face of the tube on an incident side using an acrylic adhesive (Photobond 300, Meisei Sunrise K.K.).

A similar optical waveguide tube without a window disc was prepared as a control.

Both the optical waveguide tubes were coupled to 150-W focus halogen lamps for fiber optics (manufactured by Hayashi Watch K.K.) whereupon a continuous lighting test of burning the lamp for 8 hours a day was carried out for several days. The tube with a window disc remained intact. In contrast, the control tube without a window disc started smoking on the fifth day. At the end of the test, the incident end face of the control tube was observed to find a carbonized area of about 2 mm in diameter.

Example 2

An optical waveguide tube having a diameter of 13.6 mm was prepared using a FEP tube with a gage of 0.6 mm as the cladding and a 4/6 copolymer of Acrylate M and Acrylate SL (manufactured by Mitsubishi Rayon K.K.) as the core. As shown in FIG. 5, a window disc of quartz having a thickness of 1 cm was bonded to each end face of the tube using an acrylic adhesive (Photobond 300, Meisei Sunrise K.K.). A pressure-sensitive adhesive tape in the form of a Teflon film of 2 cm wide having an acrylic adhesive coated thereon was wrapped around the tube end and the window disc. A heat shrinkable PFA sleeve of 4 cm long was fitted over the wrapped tape.

On the optical waveguide tube having the tape and sleeve mounted thereon, a thermal cycling test consisting of cooling at −30° C. for 1 hour and heating at 80° C. for 1 hour was continuously carried out for 7 days. Projection of the core from the cladding was not observed during the test.

Another optical waveguide tube was similarly prepared as shown in FIG. 6 by treating the outer peripheral surface portion of the cladding on which a ferrule was to be fitted with Tetra-Etch (sodium based surface treating agent by Junko K.K.), then fitting a ferrule on the outer periphery of the cladding and the window disc and bonding the ferrule thereto with an epoxy resin adhesive. From this tube, equivalent results were obtained in the thermal cycling test.

Example 3

An optical waveguide tube having a diameter of 13.6 mm was prepared using a FEP tube with a gage of 0.6 mm as the cladding and a 4/6 copolymer of Acrylate M and Acrylate SL (manufactured by Mitsubishi Rayon K.K.) as the core. As shown in FIG. 7, a window disc of Pyrex® having a thickness of 0.5 cm was bonded to each end face of the tube using an acrylic adhesive (Photobond 300, Meisei Sunrise K.K.). A heat shrinkable FEP sleeve with a gage of 0.3 mm was fitted over the cladding end and the window disc to cover the outer periphery thereof. A generally cylindrical stainless steel ferrule having an outer diameter of 16.0 mm, an inner diameter of 14.3 mm and a length of 30 mm was fitted over the sleeve. The ferrule was externally fastened in a triple-ring pattern to a crimping rate of about 40%.

On the optical waveguide tube, a thermal cycling test consisting of cooling at −30° C. for 1 hour and heating at 80° C. for 1 hour was continuously carried out for 7 days. Projection of the core from the cladding was not observed during the test.

Example 4

An optical waveguide tube having a diameter of 13.6 mm was prepared using a FEP tube with a gage of 0.6 mm as the cladding and a 4/6 copolymer of Acrylate M and Acrylate SL (manufactured by Mitsubishi Rayon K.K.) as the core. As shown in FIG. 10, a window disc of Pyrex® having a diameter of 13.5 mm and a thickness of 5 mm was bonded to each end face of the tube using an acrylic adhesive (Photobond 300, Meisei Sunrise K.K.). A heat resistant, pressure-sensitive adhesive tape in the form of a Kapton film with a gage of 0.3 mm having a silicone adhesive coated thereon was wrapped around the cladding end and the window disc to cover the outer periphery thereof. A generally cylindrical stainless steel ferrule with an outer diameter of 16.0 mm, an inner diameter of 14.3 mm and a length of 30 mm and having an annular collar with a width of 0.5 mm at a rear end was fitted over the wrapped tape until the collar on the inside surface abutted against the window disc. The ferrule was externally fastened in a triple-ring pattern to a crimping rate of about 40%.

On the optical waveguide tube, a thermal cycling test consisting of cooling at −30° C. for 1 hour and heating at 80° C. for 1 hour was continuously carried out for 7 days. Projection of the core from the cladding was not observed during the test.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical waveguide tube comprising;
    a tubular cladding,
    a solid core within the cladding having a higher refractive index than the cladding, the core having opposed end faces, and
    a light transmissive window member disposed in close contact with at least the end face of said core on a light incident side over its entire surface, wherein the core is formed of a flexible plastic material and the window member is formed of an inorganic glass material.

2. An optical waveguide tube comprising;
    a tubular cladding,
    a solid core within the cladding having a higher refractive index than the cladding, the core having opposed end faces,
    a light transmissive window member disposed in close contact with at least the end face of said core on a light incident side over its entire surface, and
    means disposed around said cladding and said window member for securing said window member to said cladding, wherein said securing means comprises a tape wrapped around said cladding and said window member.

3. The optical waveguide tube of claim 1 wherein said window member is adhesively bonded to the core end face.

4. The optical waveguide tube of claim 2 wherein the core is formed of a flexible plastic material and the window member is formed of an inorganic glass material.

5. The optical waveguide tube of claim 2 wherein the tape is wrapped on the outer periphery of said cladding and said window member with an adhesive intervening therebetween.

6. The optical waveguide tube of claim 2 wherein said sleeve is a heat shrinkable sleeve which is heat shrunk to cover the outer periphery of said cladding and said window member.

7. An optical waveguide tube comprising;
   a tubular cladding,
   a solid core within the cladding having a higher refractive index than the cladding, the core having opposed end faces,
   a light transmissive window member disposed in close contact with at least the end face of said core on a light incident side over its entire surface, and
   means disposed around said cladding and said window member for securing said window member to said cladding, wherein said securing means comprises at least one of a sleeve and a ferrule surrounding said cladding and said window member.

8. The optical waveguide tube of claim 7 wherein the ferrule is adhesively bonded to said cladding and said window member for surrounding the outer periphery thereof.

9. An optical waveguide tube having opposed end comprising;
   tubular cladding,
   solid core within the cladding having a higher refractive index than the cladding, and
   a ferrule surrounding the outer periphery of the cladding at each end, said ferrule being fastened for securing the cladding to the core at each end, and further comprising a tape of a sleeve disposed between said ferrule and said cladding.

10. The optical waveguide tube of claim 9 wherein the core has opposed end faces, the tube further comprising a light transmissive window member disposed in close contact with at least the end face on a light incident side.

11. The optical waveguide tube of claim 10 wherein said window member is adhesively bonded to the core end face.

12. An optical waveguide tube having opposed end comprising;
   a tubular cladding,
   a solid core within the cladding having a higher refractive index than the cladding, and
   a ferrule surrounding the outer periphery of the cladding at each end, said ferrule being fastened for securing the cladding to the core at each end, wherein the core has opposed end faces, the tube further comprising a light transmissive window member disposed in close contact with at least the end face on a light incident side and the core is formed of a flexible plastic material and the window member is formed of an inorganic glass material.

13. The optical waveguide tube of claim 12 further comprising
   a tape wrapped around said cladding and said window member, with an adhesive intervening therebetween, for securing said window member to said cladding, and
   a ferrule fitted over the tape wrapping and fastened to said cladding.

14. The optical waveguide tube of claim 12 further comprising
   a heat shrinkable sleeve fitted over said cladding and said window member and heat shrunk for securing said window member to said cladding, and
   a ferrule fitted over the sleeve and fastened to said cladding.

15. The optical waveguide tube of claim 12 further comprising
   a tape wrapped around said cladding and said window member, with an adhesive intervening therebetween, and
   a heat shrinkable sleeve fitted over said tape wrapping and heat shrunk for securing said window member to said cladding,
   the ferrule being fitted over the sleeve and fastened to said cladding.

16. An optical waveguide tube having opposed end comprising
   a tubular cladding,
   a solid core within the cladding having a higher refractive index than the cladding, said core having opposed end faces, and
   a tubular member secured to said cladding at each end for surrounding the outer periphery thereof, said member having a radially inwardly extending collar which is abutted against the core end face.

17. The optical waveguide tube of claim 16 further comprising a light transmissive window member disposed in close contact with at least the end face of said core on a light incident side, said collar being abutted against the outer surface of said window member.

18. The optical waveguide tube of claim 17 wherein said window member is adhesively bonded to the core end face.

19. The optical waveguide tube of claim 17 wherein the core is formed of a flexible plastic material and the window member is formed of an inorganic glass material.

20. The optical waveguide tube of claim 16 wherein said tubular member is a metallic ferrule which is fastened to said cladding.

21. The optical waveguide tube of claim 20 further comprising a tape or a sleeve disposed between said ferrule and said cladding.

22. The optical waveguide tube of claim 17 wherein said tubular member is a metallic ferrule which is fastened to said cladding and said window member.

23. The optical waveguide tube of claim 22 further comprising a tape wrapped around said cladding and said window member, with an adhesive intervening therebetween, for securing said window member to said cladding, the ferrule being fitted over the tape wrapping and fastened to said cladding.

24. The optical waveguide tube of claim 22 further comprising a heat shrinkable sleeve fitted over said cladding and said window member and heat shrunk for securing said window member to said cladding, the ferrule being fitted over the sleeve and fastened to said cladding.

25. The optical waveguide tube of claim 22 further comprising
   a tape wrapped around said cladding and said window member, with an adhesive intervening therebetween, and
   a heat shrinkable sleeve fitted over said tape wrapping and heat shrunk for securing said window member to said cladding,
   the ferrule being fitted over the sleeve and fastened to said cladding.

26. The optical waveguide tube of claim 7 wherein said window member is adhesively bonded to the core end face.

27. The optical waveguide tube of claim 7 wherein the core is formed of a flexible plastic material and the window member is formed of an inorganic glass material.

28. An optical waveguide tube comprising;
a tubular cladding,
a solid core within the cladding having a higher refractive index than the cladding, the core having opposed end faces,
a light transmissive window member disposed in close contact with at least the end face of said core on a light incident side over its entire surface, and
means disposed around said cladding and said window member for securing said window member to said cladding, wherein said securing means comprises
a tape wrapped on the outer periphery of said cladding and said window member with an adhesive intervening therebetween and
a sleeve fitted over the wrapped tape and heat shrunk thereto for tightly surrounding said cladding and said window member.

* * * * *